US012662330B2

(12) United States Patent
Priero

(10) Patent No.: US 12,662,330 B2
(45) Date of Patent: Jun. 23, 2026

(54) DEVICE AND METHOD FOR TRANSFERRING AND ACCUMULATING OBJECTS

(71) Applicant: EUROPOOL—S.r.l., Fidenza (IT)

(72) Inventor: Marco Priero, Fidenza (IT)

(73) Assignee: EUROPOOL—S.R.L., Fidenza (IT)

( * ) Notice: Subject to any disclaimer, the term of this patent is extended or adjusted under 35 U.S.C. 154(b) by 256 days.

(21) Appl. No.: 18/258,682

(22) PCT Filed: Nov. 16, 2021

(86) PCT No.: PCT/IB2021/060603
§ 371 (c)(1),
(2) Date: Jun. 21, 2023

(87) PCT Pub. No.: WO2022/136965
PCT Pub. Date: Jun. 30, 2022

(65) Prior Publication Data
US 2024/0067462 A1     Feb. 29, 2024

(30) Foreign Application Priority Data
Dec. 23, 2020     (IT) ........................ 102020000032321

(51) Int. Cl.
*B65G 47/51*          (2006.01)
(52) U.S. Cl.
CPC .. *B65G 47/5127* (2013.01); *B65G 2201/0244* (2013.01)
(58) Field of Classification Search
CPC ............ B65G 47/5127; B65G 47/5131; B65G 47/5113

(Continued)

(56) References Cited

U.S. PATENT DOCUMENTS

| | | | | |
|---|---|---|---|---|
| 2,560,995 A | * | 7/1951 | Stiles ................... | B65G 47/682 |
| | | | | 198/448 |
| 4,986,407 A | * | 1/1991 | Heuft ................... | B65G 47/766 |
| | | | | 198/367 |

(Continued)

FOREIGN PATENT DOCUMENTS

| | | | | |
|---|---|---|---|---|
| DE | 10312695 B4 | * | 4/2007 | .......... B65G 47/514 |
| EP | 0373060 A1 | | 6/1990 | |

(Continued)

OTHER PUBLICATIONS

DE 10312695 B4, 2007, Machine Translation, retrieved from FIT database, Jan. 9, 2026 (Year: 2007).*

(Continued)

*Primary Examiner* — William R Harp
(74) *Attorney, Agent, or Firm* — Chrisman Gallo Tochtrop LLC

(57)          ABSTRACT

An apparatus for transferring and accumulating objects. The apparatus includes a plurality of accumulation channels and a single-row conveyor belt for conveying objects arranged upstream of the accumulation channels, in which the objects advance one after the other in a single row. The apparatus further includes at least a first and a second transfer device arranged upstream of the accumulation channels for transferring the objects from the conveyor belt to the accumulation channels. Each transfer device is arranged and shaped so as to communicate with one of the accumulation channels, the first and the second transfer device comprises respectively a first and a second movable portion which are movable along two parallel sliding directions so as to be arranged at different accumulation channels. The apparatus also includes an alternative divider configured to enable in turn the communication between the single-row conveyor belt and one of the transfer devices.

3 Claims, 7 Drawing Sheets

(58) Field of Classification Search
    USPC ............................................. 198/347.4, 456
    See application file for complete search history.

(56)                     References Cited

U.S. PATENT DOCUMENTS

| | | | | |
|---|---|---|---|---|
| 6,286,654 B1 * | 9/2001 | Gorniak | ............... | B65G 1/0414 |
| | | | | 198/347.4 |
| 12,291,405 B2 * | 5/2025 | Seger | .................... | B65G 47/71 |

FOREIGN PATENT DOCUMENTS

| | | | |
|---|---|---|---|
| EP | 3401247 | A1 | 11/2018 |
| WO | 2019011516 | A1 | 1/2019 |

OTHER PUBLICATIONS

International Search Report and Written Opinion, as issued in connection with International Patent Application No. PCT/IB2021/060603, dated Feb. 28, 2022.

* cited by examiner

DEVICE AND METHOD FOR TRANSFERRING AND ACCUMULATING OBJECTS

TECHNICAL FIELD

The present invention relates to an apparatus and a method for transferring and accumulating objects. In particular, the objects may be bottles, containers or the like.

BACKGROUND

In production and packaging lines, for example between two successive workstations, the use of an accumulation table which acts as a buffer for objects coming from the upstream station is known, in particular when jamming occurs upstream and/or during maintenance interventions. The use of an accumulation table therefore prevents having to stop the upstream station as well.

There are different accumulation table architectures and different accumulation logics on the market, tailored to the specific needs of the line.

For example, WO2014/076390 presents an accumulation table interposed between an input belt and an output belt, on which rows of objects are transferred and on which heads and/or manipulating robots adapted to move the rows on the table operate.

Feeding in rows can cause problems with the continuous operation of the system. In addition, the use of manipulating robots affects overall dimensions and increases the complexity of the line control logic.

Furthermore, some types of products, particularly delicate ones, require careful handling management.

Another solution of known type, described in EP3221240, shows an accumulator device for dynamically accumulating products in which two parallel conveyor belts are put in communication by a transfer device (a curve) movable along the belts. By moving the transfer device along the belts, it is possible to generate a certain space between two products so that products do not arrive downstream of the transfer device for a given time interval.

Such a device is used for small accumulation tables. As the size of the table increases, the speed and effort required accordingly increase, losing efficiency (i.e., lower hourly line yield).

SUMMARY

An apparatus for transferring and accumulating objects. The apparatus includes a plurality of accumulation channels and a single-row conveyor belt for conveying objects arranged upstream of the accumulation channels, in which the objects advance one after the other in a single row. The apparatus further includes at least a first and a second transfer device arranged upstream of the accumulation channels for transferring the objects from the conveyor belt to the accumulation channels. Each transfer device is arranged and shaped so as to communicate with one of the accumulation channels, the first and the second transfer device comprises respectively a first and a second movable portion which are movable along two parallel sliding directions so as to be arranged at different accumulation channels The apparatus also includes an alternative divider configured to enable in turn the communication between the single-row conveyor belt and one of the transfer devices.

BRIEF DESCRIPTION OF DRAWINGS

Further features and advantages of the present invention will more fully emerge from the indicative and thus nonlimiting description of a preferred but not exclusive embodiment of an apparatus and a method for transferring and accumulating objects, as illustrated in the accompanying drawings, in which.

DETAILED DESCRIPTION

Figures 1A, 1B:
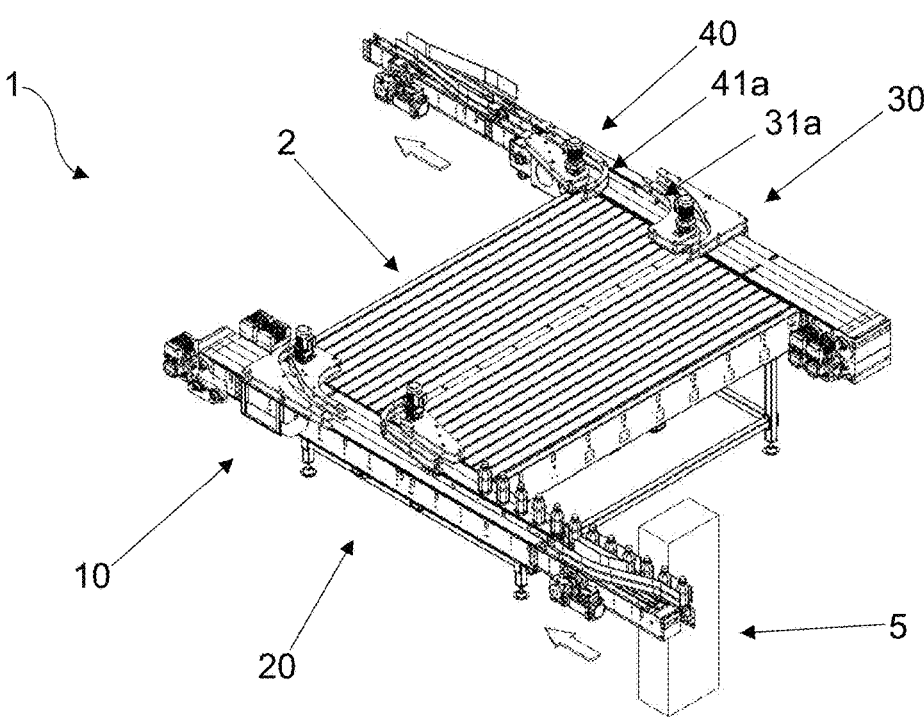
FIGS. 1*a*, 2*a*, 3*a*, 4*a*, and 5*a* illustrate an apparatus in accordance with the present invention, in different operating steps, in perspective view.
FIGS. 1*b*, 2*b*, 3*b*, 4*b*, and 5*b* illustrate the apparatus from above in the steps shown in FIGS. 1*a*, 2*a*, 3*a*, 4*a*, and 5*a*.
Figure 2A:
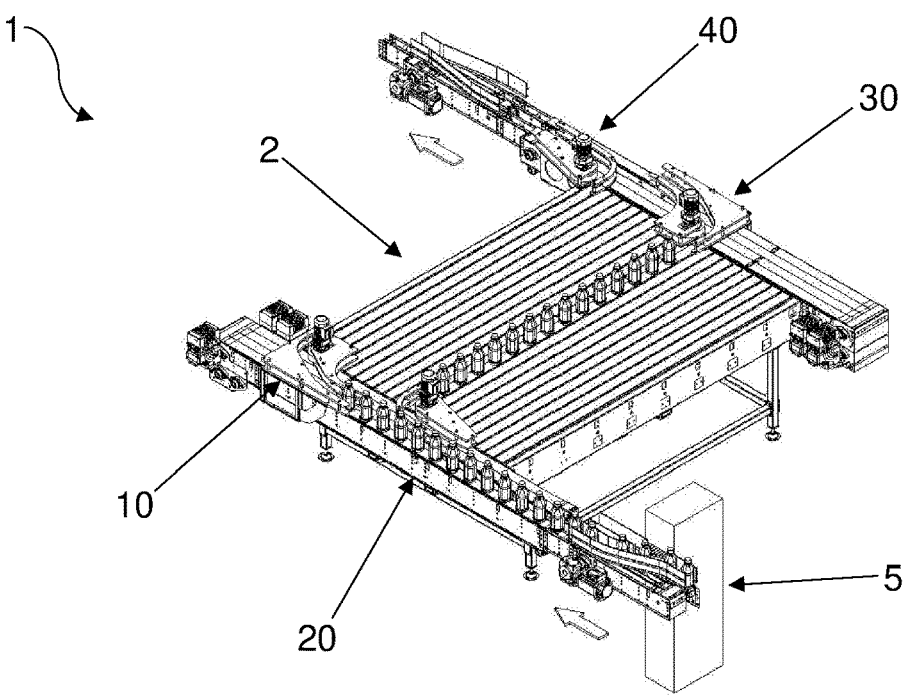
Figure 2B:
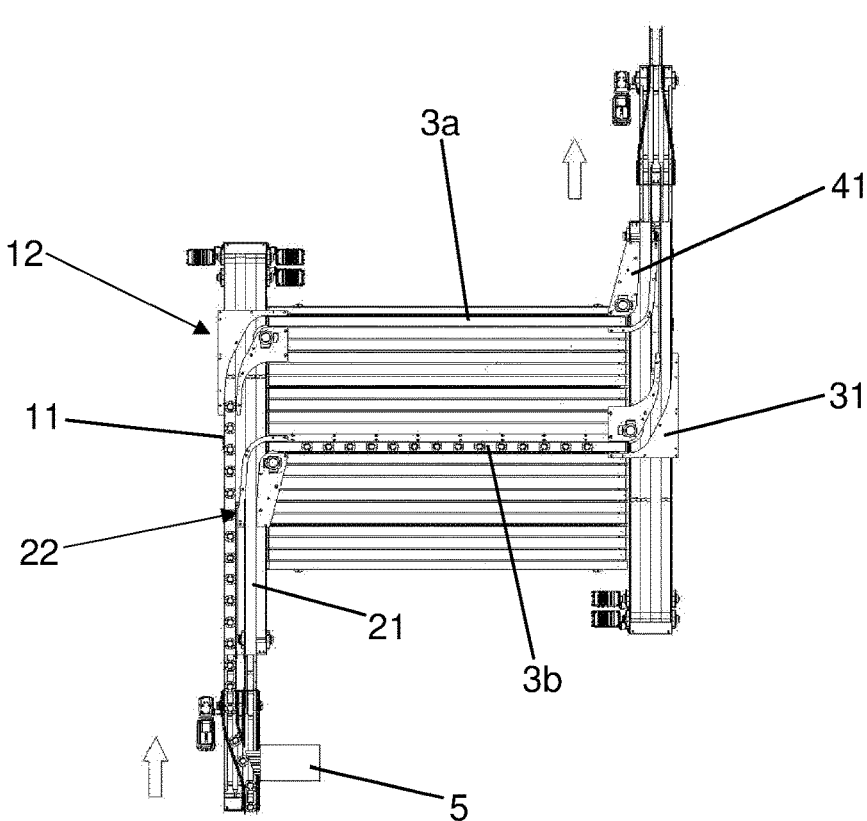
Figure 3A:
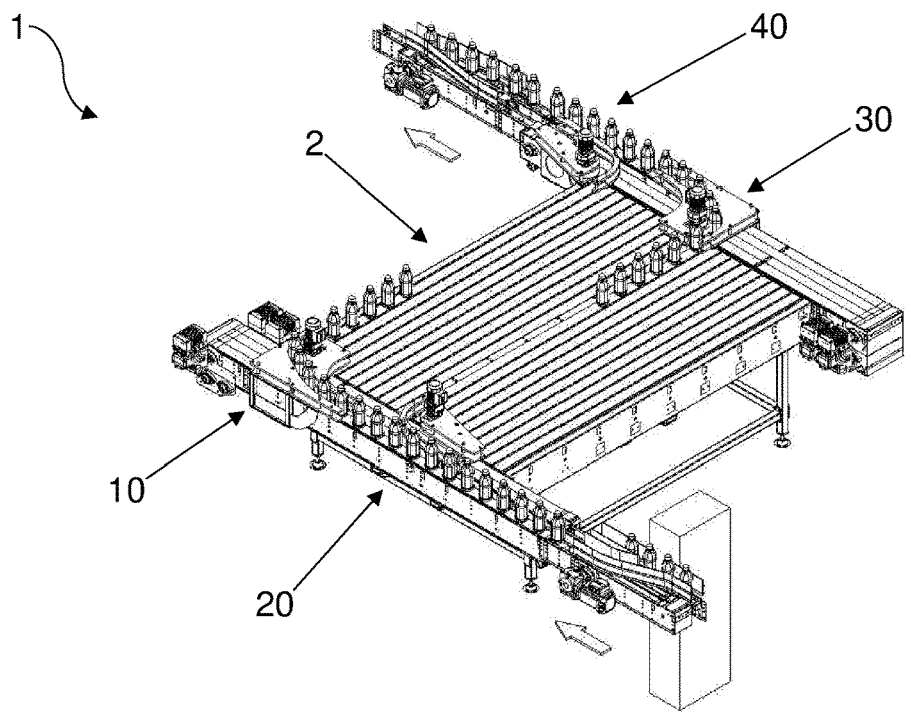
Figure 3B:
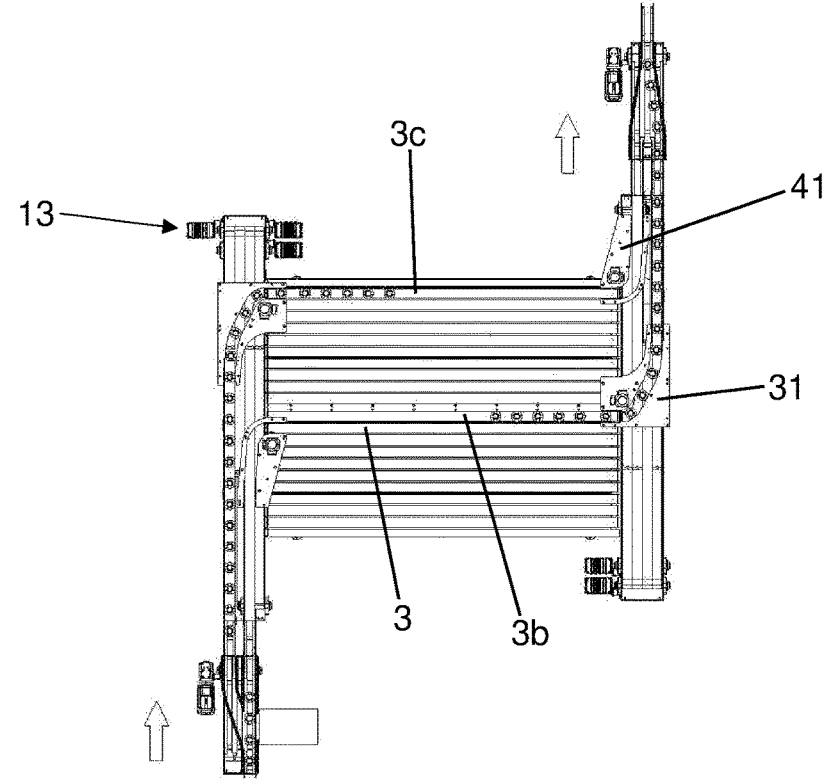
Figure 4A:
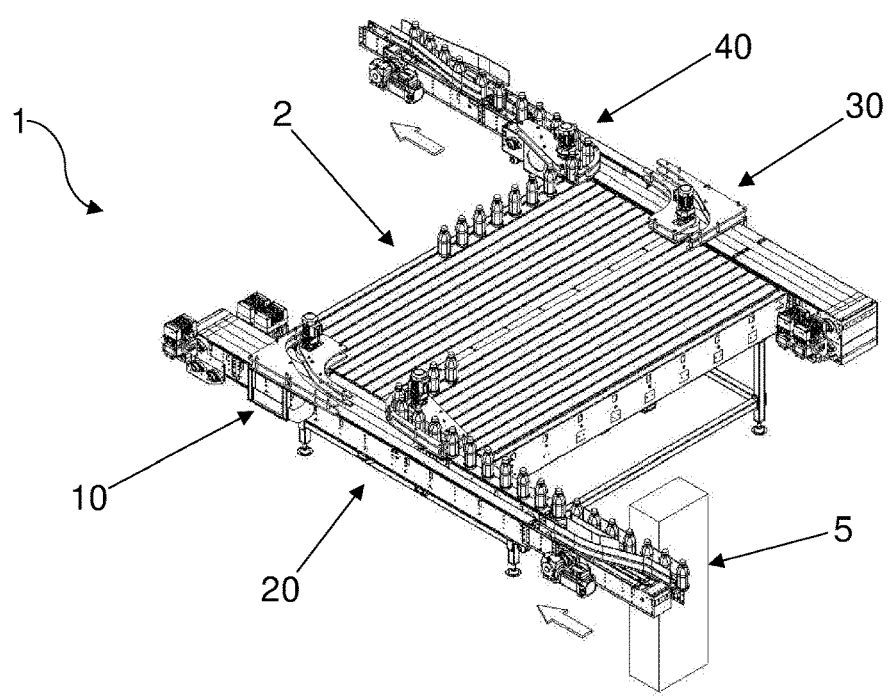
Figure 4B:
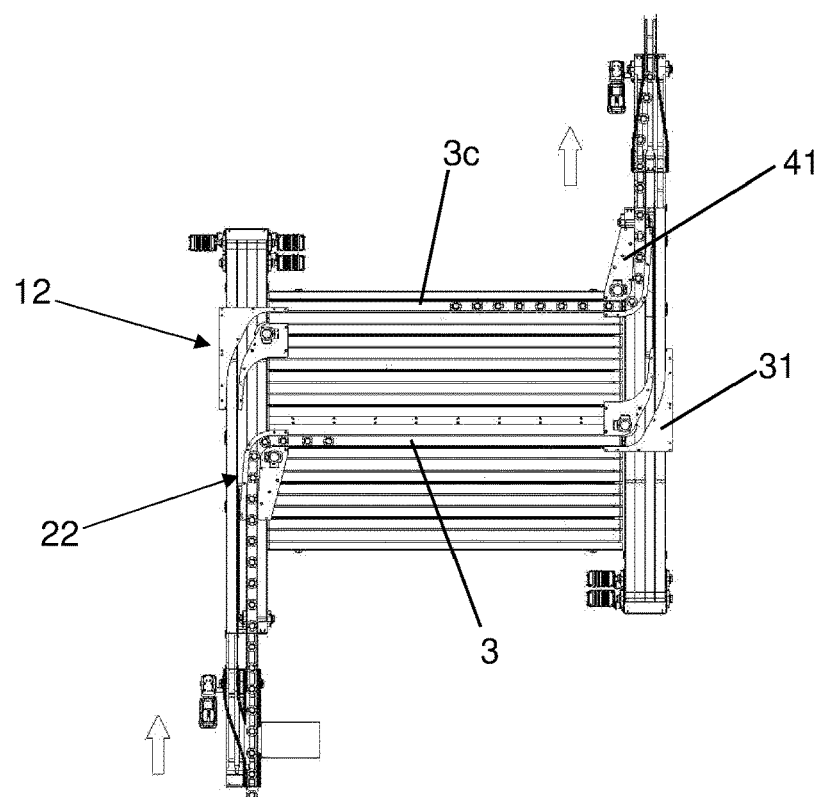
Figure 5A:
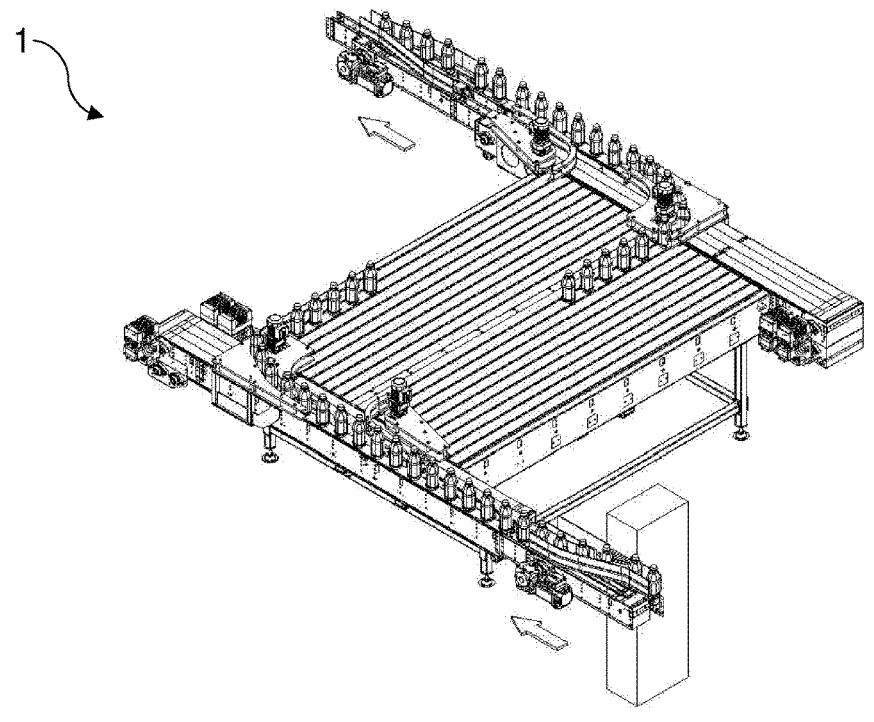
Figure 5B:
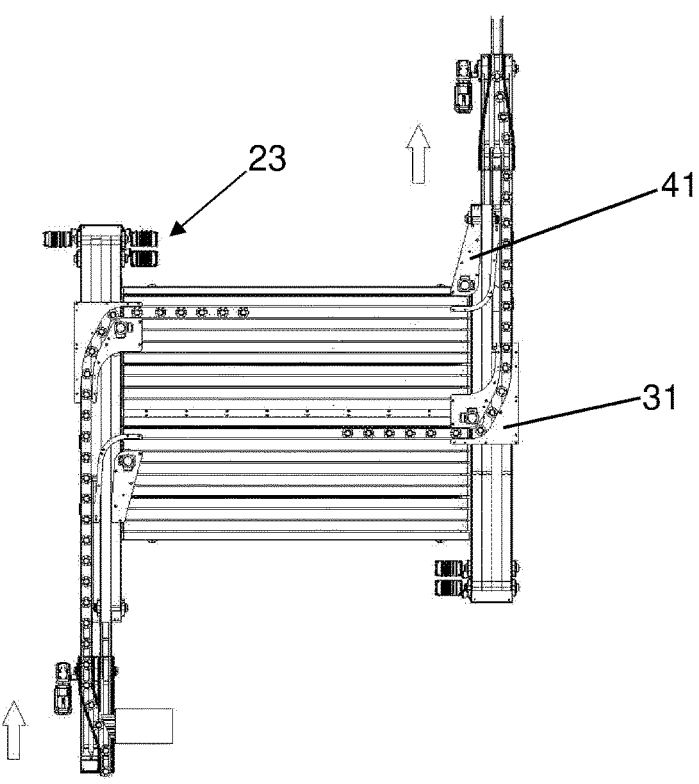
Figure 6:
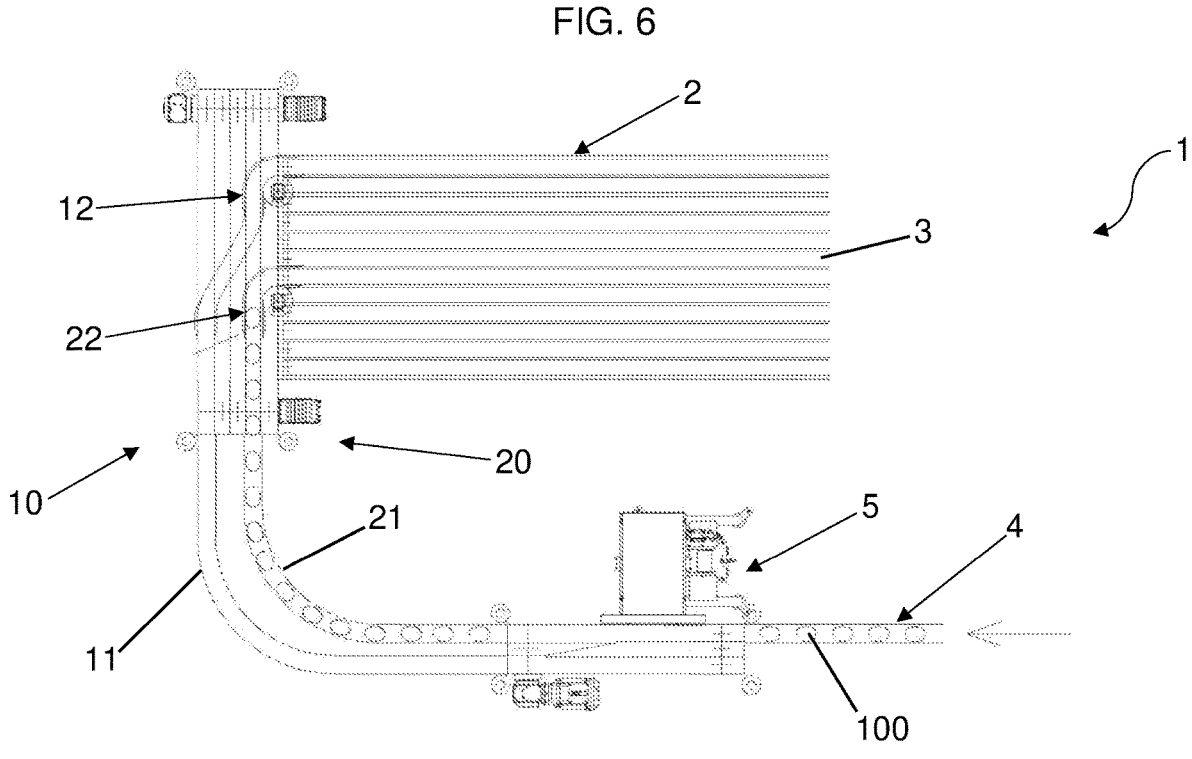
FIGS. 6 and 7 illustrate two embodiments of the apparatus in accordance with the present invention.
Figure 7:
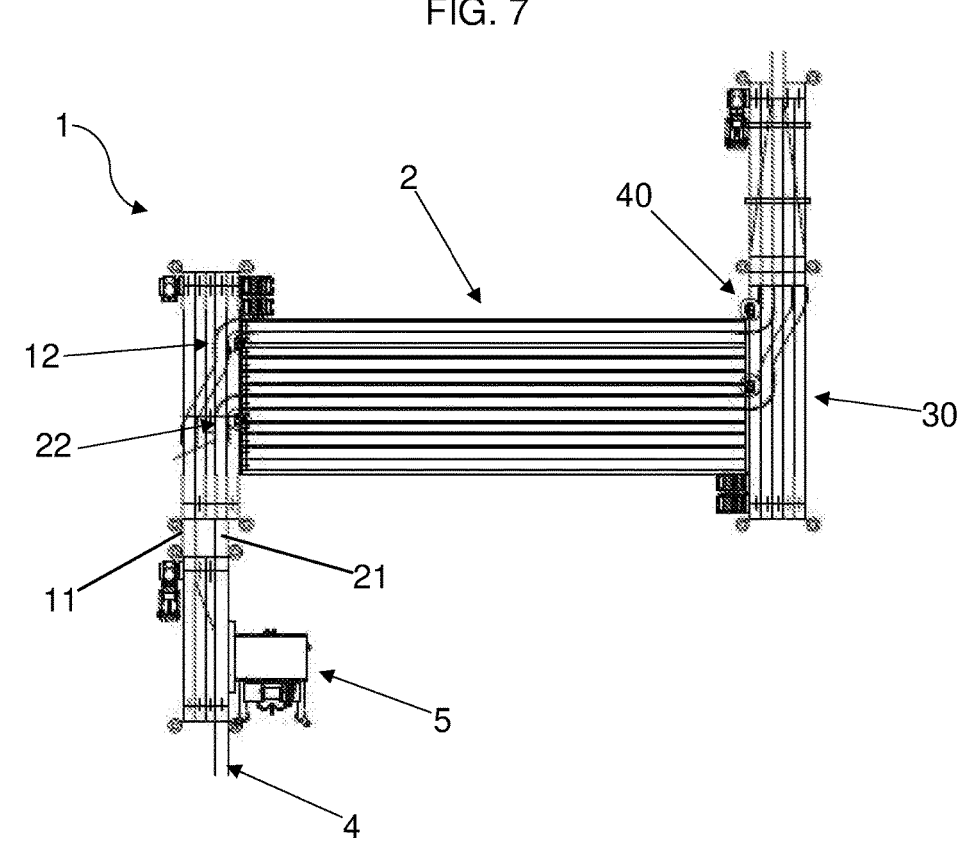
Figure 8:
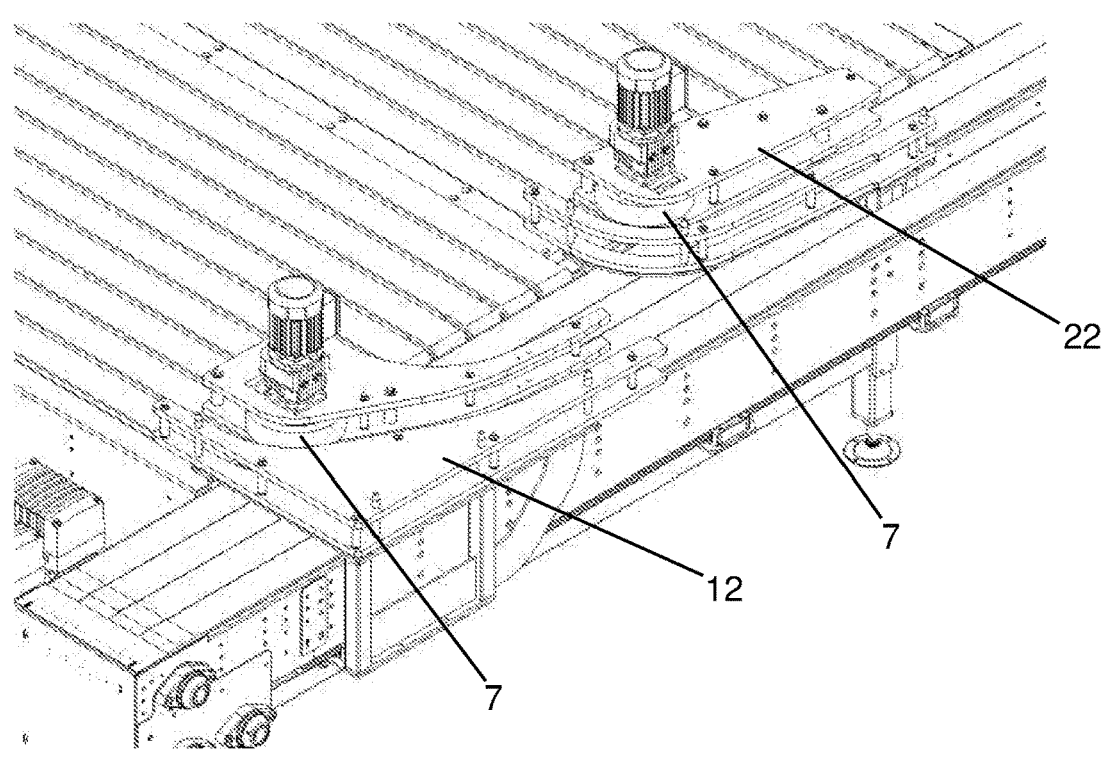
FIGS. 8 and 9 illustrate a detail (rotating disc) of the apparatus of the preceding figures, in perspective view.
Figure 9:
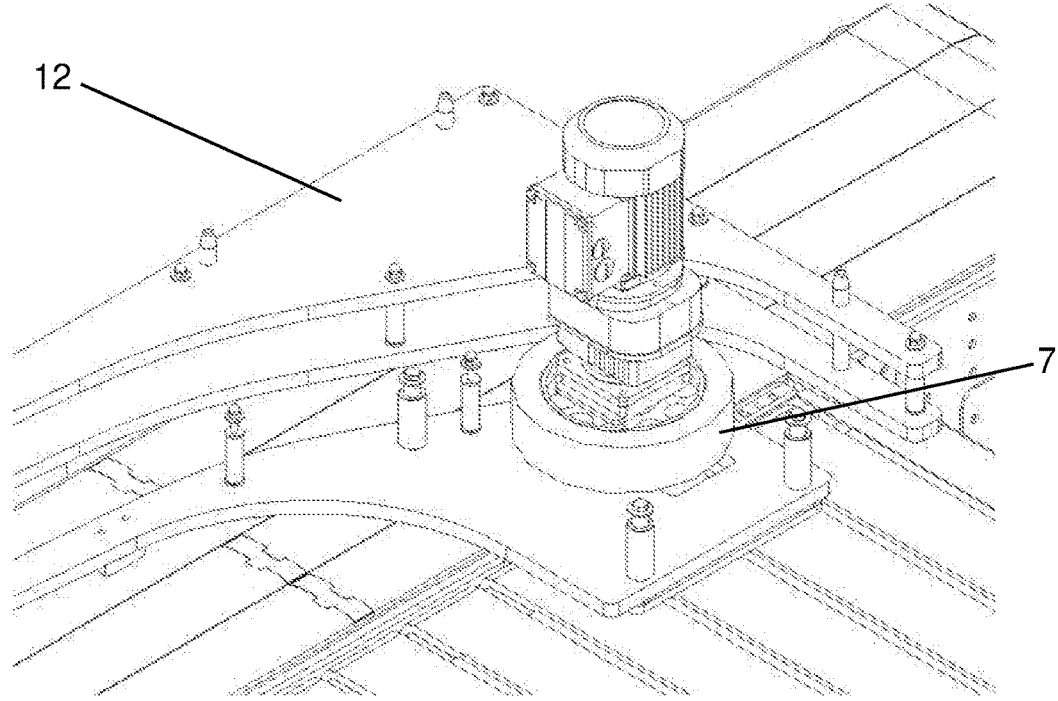

The technical task underpinning the present disclosure is to propose an apparatus and a method for transferring and accumulating objects, which obviate the above-cited drawbacks of the prior art.

In particular, the object of the present disclosure is to provide an apparatus and a method for transferring and accumulating objects, which allows a low cycle time to be maintained without affecting the production yield of the system, regardless of the format of objects or the size of the accumulation table.

The stated technical task and specified objects are substantially achieved by an apparatus for transferring and accumulating objects, comprising:

a plurality of accumulation channels;

a single-row conveyor belt for conveying objects arranged upstream of the accumulation channels, in which the objects advance one after the other in a single row; and at least a first and a second transfer device arranged upstream of the accumulation channels for transferring the objects from the conveyor belt to the accumulation channels.

Each transfer device is arranged and shaped so as to communicate with one of the accumulation channels. The first and the second transfer device respectively comprise a first and a second movable portion along two parallel sliding directions so as to be arranged at different accumulation channels.

The apparatus further comprises an alternative divider configured to enable in turn, i.e., alternatively, the communication between the single-row conveyor belt and one of the transfer devices.

In accordance with an embodiment, the apparatus comprises a counter configured to count the objects transferred from the single-row conveyor belt. Upon reaching a predetermined number of objects transferred to one of the transfer devices, the divider is configured to impose an operating condition on the first transfer device, in which a flow of objects slides thereon towards the accumulation channels and simultaneously impose a resting condition on the second transfer device, in which a flow of objects does not slide thereon, or vice versa.

In accordance with an embodiment, each movable portion comprises a loading guide arranged at one of the accumulation channels to guide the objects therein. Each movable portion further comprises a carriage associated with the loading guide to move it along the sliding direction.

In accordance with an embodiment, each transfer device comprises a feed channel which receives objects from the conveyor belt and is shaped so as to carry the objects towards the movable portion.

In accordance with an embodiment, the apparatus comprises a track interposed between the feed channel and the loading guide. The track extends according to a direction substantially parallel to the sliding direction. The loading guide runs along the track.

In accordance with an embodiment, the divider comprises an abutment element movable between a first engagement position, in which it engages at least in part the first transfer device, and a second position, in which it is housed in a seat obtained in the divider.

In accordance with an embodiment, the abutment element has an engagement surface shaped so as to guide the flow of objects towards the second transfer device.

The defined technical task and the specified objects are substantially reached by a method for transferring and accumulating objects from a single-row conveyor belt to a plurality of accumulation channels, comprising the steps of:

> directing the flow of objects from the single-row conveyor belt towards a first transfer device positioned at a first accumulation channel;
>
> filling the first accumulation channel with the objects fed by the first transfer device;
>
> upon reaching a predetermined number of objects directed towards the first transfer device, diverting the flow of objects towards a second transfer device positioned at a second accumulation channel; and
>
> filling the second accumulation channel with the objects fed by the second transfer device.

During the step of diverting the flow of objects towards the second transfer device and/or the step of filling the second accumulation channel, a step of moving the first transfer device so as to communicate with a third accumulation channel is performed.

In accordance with an embodiment of the method, the predetermined number of objects indicates a filled condition of the accumulation channel.

In accordance with an embodiment of the method, the method further comprises a step of diverting the flow of objects towards the first transfer device arranged at the third accumulation channel, upon reaching a predetermined number of objects directed towards the second transfer device.

With reference to the figures, number 1 denotes an apparatus for transferring and accumulating objects 100.

The apparatus 1 comprises a plurality of accumulation channels 3. In the embodiment described and illustrated herein, the plurality of accumulation channels 3 extends along an accumulation table 2.

Alternatively, the accumulation channels 3 may be part of two or more flanked accumulation tables. Alternatively, the accumulation channels 3 each constitute an independent unit.

In the embodiment described and illustrated herein, the accumulation table 2 extends along a first direction. The accumulation channels 3 extend along a plurality of directions parallel to each other and to the first direction. The accumulation channels 3 are flanked according to a flanking direction substantially orthogonal to the first direction.

Upstream of the accumulation channels 3, a single-row conveyor belt 4 is arranged in which the objects 100 advance one after the other in a single row.

In the embodiment described and illustrated herein, the conveyor belt 4 is arranged upstream of the accumulation table 2.

The apparatus 1 comprises at least a first and a second transfer device 10, 20 interposed between the single-row conveyor belt 4 and the accumulation channels 3 (for example of the single accumulation table 2). Each transfer device 10, 20 is arranged and shaped so as to communicate with one of the accumulation channels 3 of the accumulation table 2.

The first and the second transfer device 10, 20 respectively comprise a first and a second movable portion 12, 13, 22, 23 which is movable along two parallel sliding directions so as to be arranged at different accumulation channels 3.

Preferably, the two sliding directions are inclined with respect to the first direction. Preferably, they are substantially orthogonal with respect to the first direction. In particular, they are substantially parallel to the flanking direction of the accumulation channels 3.

Alternatively, the two sliding directions are substantially parallel to the first direction.

It should be noted that the terms "first transfer device" and "second transfer device" are interchangeable. That is, what has been said with reference to the first transfer device should also be considered as referring to the second transfer device, and vice versa.

Preferably, the first transfer device 10 comprises a first feed channel 11 which can receive objects 100 from the single-row conveyor belt 4. The first feed channel 11 is shaped so as to bring the objects 100 towards the first movable portion 12, 13.

In the embodiment described and illustrated herein, the first movable portion comprises a loading guide 12 arranged at one of the accumulation channels 3 to guide the objects 100 therein. The first movable portion further comprises a first carriage 13 associated with the first loading guide 12 to move it along the sliding direction thereof. Thereby, the objects coming from the first feed channel 11 reach the first loading guide 12 which is moved by the first carriage 13 so as to be positioned at one of the accumulation channels 3.

Preferably, the first loading guide 12 has at least one curvilinear section for delivering the objects 100 to the accumulation channel 3.

The first feed channel 11 may be made in a single piece or may comprise multiple tracks arranged one after the other so as to define such a first feed channel 11.

Preferably, the second transfer device 20 comprises a second feed channel 21 which can receive objects 100 from the single-row conveyor belt 4. The second feed channel 21 is shaped so as to bring the objects towards the second movable portion 22, 23.

In the embodiment described and illustrated herein, the second movable portion comprises a second loading guide 22 arranged at one of the accumulation channels 3 to guide the objects 100 therein. The first movable portion further comprises a second carriage 23 associated with the second loading guide 22 to move it along the sliding direction thereof.

Preferably, the second loading guide 22 has at least one curvilinear section for delivering the objects 100 in the accumulation channel 3.

The second feed channel 21 may be made in a single piece or may comprise multiple tracks arranged one after the other so as to define such a second feed channel 21.

In particular, the first and the second loading guide 12, 22 are motorized.

Preferably, the first and the second loading guide 12, 22 are shaped so as to be able to communicate with two adjacent accumulation channels 3. In particular, the first and the second loading guide 12, 22 have two corresponding surfaces intended to come into contact. Preferably, such two corresponding surfaces are shaped so as to be complementary.

In accordance with an embodiment described and illustrated herein, the apparatus 1 comprises an alternative divider 5 configured to enable in turn, i.e., alternatively, the communication between the single-row conveyor belt 4 and one of the transfer devices 10, 20. It is important to underline that when the single-row conveyor belt 4 communicates with the first transfer device 10, the second transfer device 20 can in no way receive objects from the conveyor belt 4. That is, the communication established by the divider 5 is exclusive.

The first transfer device 10 then selectively communicates upstream with the conveyor belt 4 and downstream with one of the accumulation channels 3.

An apparatus 1 having two transfer devices 10, 20 has been described herein. However, it is understood that the apparatus 1 may also comprise a greater number of transfer devices, as the operating logic does not change. The single-row conveyor belt 4 always communicates with only one transfer device 10, 20 at a time and communicates with all of them in turns.

Preferably, the apparatus 1 comprises a control unit configured to count the objects 100 transferred from the single-row conveyor belt 4. The control unit is also configured, upon reaching a predetermined number of objects 100 transferred to one of the transfer devices 10, 20, to operate the divider 5 so as to impose an operating condition on the first transfer device 10, in which a flow of objects 100 slides thereon towards the accumulation table 2 and simultaneously impose a resting condition on the second transfer device 20, in which a flow of objects 100 does not slide thereon, or vice versa.

The first and/or the second transfer device 10, 20 are moved along the sliding direction thereof from one accumulation channel 3 to another only during the resting condition thereof. It is thereby possible to sort the flow of objects 100 without flow interruptions, passing from a (full) channel to a new channel to start filling. In fact, the transfer device which is in the resting condition has all the time to move at another channel without having to interrupt the flow of objects 100, which are diverted by the other transfer device in the operating condition on the corresponding channel.

That is, the resting condition of a transfer device is not dead time, but time during which the transfer of objects occurs by means of another transfer device.

In particular, the divider 5 is configured to interrupt the communication between the single-row conveyor belt 4 and the first transfer device 10 and enable the communication thereof with the second transfer device 20, upon reaching a predetermined number of objects 100 transferred to the first transfer device 10. That is, the divider 5 is configured to divert the flow of objects towards the other transfer device 10, 20. "Other transfer device" herein means the transfer device 10, 20 which is not receiving the flow of objects 100.

Preferably, the predetermined number of objects 100 identifies a filled condition of an accumulation channel 3. That is, once the first transfer device 10 has received a sufficient number of objects to fill the accumulation channel 3 with which it is communicating downstream, the divider 5 prevents further objects 100 from reaching the first transfer device 10, diverting them towards the second transfer device 20.

In the embodiment described and illustrated herein, the single-row conveyor belt 4 and the first feed channel 11 are substantially aligned.

That is, an upstream end of the first feed channel 11 constitutes an extension of the conveyor belt 4. The divider 5 is arranged at the first feed channel 11 and acts thereon.

In accordance with an embodiment described and illustrated herein, the divider 5 comprises an abutment element movable between a first engagement position, in which it engages at least in part the first transfer device 10, and a second position, in which it is housed in a seat obtained in the divider 5.

In the embodiment described and illustrated herein, the abutment element in the first engagement position engages at least in part the first feed channel 11. Preferably, the first feed channel 11 is entirely crossed by the abutment element.

In particular, the divider 5 imposes the resting condition on the first transfer device 10 (which corresponds to the imposition of the operating condition on the second transfer device 20), bringing the abutment element from the second engagement position to the first engagement position.

Likewise, the divider 5 imposes the operating condition on the first transfer device 10 (which corresponds to the imposition of the resting condition on the second transfer device 20), bringing the abutment element from the first engagement position to the second engagement position.

Preferably, the abutment element has an engagement surface shaped so as to guide the flow of objects towards the second feed channel 21.

The divider 5 described above may also be obtained differently. In particular, devices of known type can be used, what is important is that they allow the single-row conveyor belt 4 to communicate with only one transfer device 10, 20 at a time.

Preferably, the apparatus 1 comprises at least two unloading devices 30, 40 downstream of the accumulation table 2. Each unloading device 30, 40 comprises an unloading guide 31, 41 communicating upstream with one of the accumulation channels 3 to convey the objects 100 away from the accumulation channels 3 (in particular from the accumulation table 2). The unloading guide 31, 41 is movable in a direction substantially parallel to the sliding direction to communicate with different accumulation channels 3.

It is also possible to apply the same logic with which the first and the second transfer device 10, 20 are governed only at the output of the accumulation channels 3.

In this case, the apparatus 1 comprises a plurality of accumulation channels 3 arranged as described above. The feeding of the objects 100 to the accumulation channels 3 can occur according to already known techniques.

The apparatus 1 further comprises two unloading devices 30, 40 arranged downstream of the accumulation channels 3.

Each unloading device 30, 40 is arranged and shaped so as to communicate with one of the accumulation channels 3.

The first and the second unloading device 30, 40 respectively comprise a first and a second guide 31, 41 communicating upstream with one of the accumulation channels 3 to convey the objects 100 away therefrom. The first and the second unloading guide 31, 41 are movable along two substantially parallel sliding directions to communicate with different accumulation channels 3.

The unloading guides 31, 41 are controlled such that, when the first is affected by a flow of objects 100 exiting from the accumulation channel 3 with which it is communicating, the second can be moved at the next accumulation channel 3 which will be emptied, and vice versa.

Also in this case, the minimum configuration includes the presence of two unloading devices 30, 40 but more than two may be used. Regardless, the logic described above applies.

Preferably, the first and the second unloading guide 31, 41 are shaped so as to be able to communicate with two adjacent accumulation channels 3. In particular, the first and the second unloading guide 31, 41 have two corresponding surfaces 31a, 41a intended to come into contact. Preferably, such two corresponding surfaces 31a, 41a are shaped so as to be complementary.

In the embodiment in which the loading guides 12, 22 or the unloading guides 31, 41 have a curvilinear or curved section, the use of a rotating disc 7 (a motorized wheel) arranged inside the curve is included, which facilitates the transfer of the objects 100 entering or exiting the accumulation channel 3. In particular, the disc 7 is particularly advantageous to facilitate the movement of the last objects 100 of a row, especially the last one. In fact, the first objects 100 in a row are pushed by the objects 100 following them. This push is missing for the last objects 100 in the row, which therefore need to be helped.

Preferably, the rotating disc 7 has a rubberised cover.

A method for transferring and accumulating objects 100 from a single-row conveyor belt 4 to a plurality of accumulation channels 3 is described below. The method is advantageously implemented by an apparatus 1 as described previously.

The method comprises the step of directing the objects 100 from the single-row conveyor belt 4 towards a first transfer device 10 connected to a first accumulation channel 3a. The first accumulation channel 3a is then filled by the objects 100 directed at the first transfer device 10.

Upon reaching a predetermined number of objects 100 directed towards the first transfer device 10, the method comprises the step of diverting the flow of objects 100 from the single-row conveyor belt 4 towards a second transfer device 20 connected to a second accumulation channel 3b. The second accumulation channel 3b is then filled by the objects 100 diverted towards the second transfer device 20.

During the step of diverting the flow of objects 100 towards the second transfer device 20 and/or the step of filling the second accumulation channel 3b, the first transfer device 10 is moved so as to communicate with a third accumulation channel 3c. The third accumulation channel 3c is different with respect to the first and the second accumulation channel 3a, 3b. The third accumulation channel 3c is at least partially clear of objects 100. Preferably, the third accumulation channel 3c is clear of objects 100. In particular, the first transfer device 10 is moved when the flow of objects 100 is directed towards the second transfer device 20. Thereby, the first transfer device 10 is in a resting condition, in which it does not receive objects 100 upstream, and can be moved at another accumulation channel 3.

Preferably, the predetermined number of objects 100 identifies a filled condition of the accumulation channel 3.

Preferably, the method then comprises a step of diverting the flow of objects 100 towards the first transfer device 10 connected to the third accumulation channel 3c, upon reaching a predetermined number of objects 100 directed towards the second transfer device 20.

Preferably, the method comprises the step of filling the third accumulation channel 3c with objects 100 diverted towards the first transfer device 10.

Similarly, during the step of diverting the flow of objects 100 towards the first transfer device 10 and/or the step of filling the third accumulation channel 3c, the second transfer device 20 is moved so as to communicate with a fourth accumulation channel 3d.

The operations described above may be repeated several times until all the accumulation channels 3 are filled.

Similarly, the method should not be limited to the described use of two transfer devices 10, 20. More than two transfer devices 10, 20 are also expected to be used, as the logic of directing the flow of objects 100 towards a single transfer device 10, 20 at a time remains unchanged.

The features of an apparatus and a method for transferring and accumulating objects are clear from the description, as are some of the advantages.

In particular, the provision of two transfer devices, in turn communicating with the upstream conveyor belt, allows to leave one of the loading guides to rest for a certain period of time. This time interval allows the loading guide to be moved from an already-filled accumulation channel to an accumulation channel to be filled. Thereby, using only two transfer devices, a potentially infinite number of accumulation channels can be filled, maintaining a low cycle time without affecting the production yield of the system, regardless of the format of objects or the size of the accumulation table.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the present invention.

The invention claimed is:

1. An apparatus for transferring and accumulating objects comprising:

a plurality of accumulation channels;

a single-row conveyor belt for conveying objects arranged upstream of the accumulation channels, wherein the objects advance one after the other in a single row;

at least a first and a second transfer device arranged upstream of the accumulation channels for transferring the objects from the single-row conveyor belt to the accumulation channels, each transfer device being arranged and shaped so as to communicate with one of the accumulation channels, said at least the first and the second transfer device comprising respectively a first movable portion and a second movable portion which are movable along two parallel sliding directions so as to be arranged at different accumulation channels;

an alternative divider configured to enable in turn communication between the single-row conveyor belt and one of the transfer devices; and at least a first unloading device and a second unloading device arranged downstream of the accumulation channels, each of the first unloading device and the second unloading device being arranged and shaped so as to communicate with one of the accumulation channels, at least the first unloading device and the second unloading device comprising, respectively:

a first guide and a second guide configured to communicate upstream with one of the accumulation channels to convey the objects away therefrom, the first guide and the second guide being configured to move along two substantially parallel sliding directions to communicate with different accumulation channels and being configured to be controlled such that in response to the first guide being affected by a flow of the objects exiting from one of the accumulation channels with which the first guide is communicating, the second guide is configured to move to another accumulation channel to be emptied, wherein said first and said second guides are shaped to communicate with two adjacent accumulation channels, and said first and said second guides having two corresponding surfaces configured to contact each other.

2. The apparatus according to claim 1, wherein each movable portion comprises:

a loading guide arranged at one of the accumulation channels to guide the objects therein; and a carriage associated with the loading guide to move it along the sliding direction.

3. The apparatus according to claim 1, wherein each transfer device comprises a feed channel which receives objects from the single-row conveyor belt and is shaped so as to carry the objects towards the movable portion.

* * * * *